(12) United States Patent
Doi

(10) Patent No.: US 12,543,929 B2
(45) Date of Patent: Feb. 10, 2026

(54) CONNECTOR, ENDOSCOPE SYSTEM, AND OPERATION METHOD OF CONNECTOR

(71) Applicant: OLYMPUS MEDICAL SYSTEMS CORP., Tokyo (JP)

(72) Inventor: Daisuke Doi, Hachioji (JP)

(73) Assignee: Olympus Medical Systems Corp., Tokyo (JP)

( * ) Notice: Subject to any disclaimer, the term of this patent is extended or adjusted under 35 U.S.C. 154(b) by 345 days.

(21) Appl. No.: 18/135,220

(22) Filed: Apr. 17, 2023

(65) Prior Publication Data

US 2023/0337897 A1    Oct. 26, 2023

Related U.S. Application Data

(60) Provisional application No. 63/333,612, filed on Apr. 22, 2022.

(51) Int. Cl.
  *A61B 1/00*  (2006.01)
  *A61B 1/015* (2006.01)

(52) U.S. Cl.
  CPC ...... *A61B 1/00128* (2013.01); *A61B 1/00121* (2013.01); *A61B 1/015* (2013.01)

(58) Field of Classification Search
  CPC .. A61B 1/00112–00128; H01R 13/005; H01R 13/639; H01R 13/6392; H01R 13/6395; H01R 2201/12
  See application file for complete search history.

(56) References Cited

U.S. PATENT DOCUMENTS

| | | | | |
|---|---|---|---|---|
| 2,883,638 A | * | 4/1959 | Mark | H01R 13/193 439/197 |
| 2010/0087705 A1 | * | 4/2010 | Byers | A61M 39/06 600/104 |

FOREIGN PATENT DOCUMENTS

| | | |
|---|---|---|
| JP | H10-178701 A | 6/1998 |
| JP | 2842659 B2 | 1/1999 |
| JP | 2002-124334 A | 4/2002 |
| JP | 2005-017602 A | 1/2005 |
| JP | 4847175 B2 | 12/2011 |

* cited by examiner

*Primary Examiner* — Aaron B Fairchild
(74) *Attorney, Agent, or Firm* — Morgan, Lewis & Bockius LLP

(57) ABSTRACT

A processor comprises a receiver including a recess. The recess includes a channel, and an inflatable body located in the channel. The inflatable body has an outer periphery surface and an inner periphery surface. The inner periphery surface defines a central opening in the inflatable body. The inflatable body is reversibly inflatable between a deflated state and an inflated state.

18 Claims, 12 Drawing Sheets

CONNECTOR, ENDOSCOPE SYSTEM, AND OPERATION METHOD OF CONNECTOR

This application is based on and claims priority under 35 U.S.C. § 119 to U.S. Provisional Application No. 63/333,612 filed on Apr. 22, 2022, the entire contents of which are incorporated herein by reference.

TECHNICAL FIELD

An embodiment of the present disclosure relates to one connector provided with a plug and a receptacle.

BACKGROUND

With an endoscope, by inserting an elongated insertion portion into a subject, a region that is not visible from outside can be observed and, by inserting treatment instruments through a treatment instrument channel of the insertion portion, various kinds of treatment can be performed using various treatment instruments that protrude from an opening of a distal end portion.

The endoscope constitutes an endoscope system together with a processor which processes endoscopic images and supplies power to the endoscope. When a plug of the endoscope is connected to a receptacle of the processor, the endoscope and the processor are electrically connected to each other.

Japanese Patent Application Laid-Open Publication No. 2002-124334 discloses a connector apparatus which, when a plug is attached to a receptacle, causes the plug to abut against the receptacle in a state of pressure contact due to a biasing force of an elastic body and which electrically connects a contact of the plug and a contact of the receptacle to each other.

SUMMARY

A processor comprises a receiver including a recess. The recess includes a channel, and an inflatable body located in the channel. The inflatable body has an outer periphery surface and an inner periphery surface. The inner periphery surface defines a central opening in the inflatable body. The inflatable body is reversibly inflatable between a deflated state and an inflated state.

An adapter comprises a first end configured to be connected to a receiver of a processor. A second end includes an adapter receiver configured to be connected to a plug of a medical instrument. The recess includes a channel, and an inflatable body located in the channel. The inflatable body has an outer periphery surface and an inner periphery surface. The inner periphery surface defines a central opening in the inflatable body. The inflatable body is reversibly inflatable between a deflated state and an inflated state.

DETAILED DESCRIPTION

First Embodiment

Hereinafter, an embodiment of the present disclosure will be described with reference to the drawings. Note that the drawings based on the embodiments are schematic in nature. A relationship between a thickness and a width in each portion of the drawings, a ratio of thicknesses among respective portions, and the like differ from reality. Furthermore, even among the drawings, the drawings include portions having a relationship or a ratio among dimensions that differ from each other. Illustration and assignment of signs with respect to a part of the components will be omitted.

Figure 1:
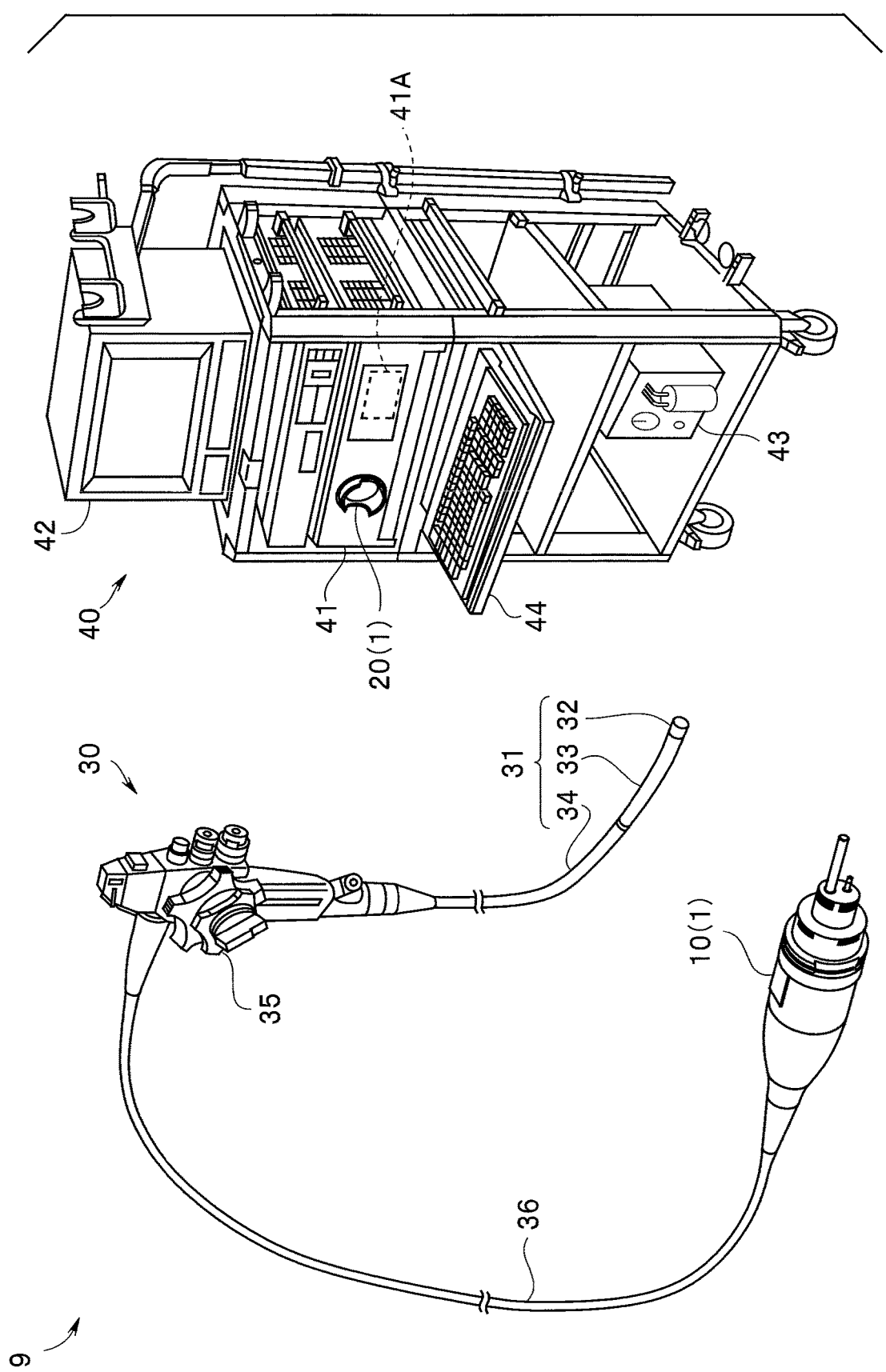
FIG. 1 is a configuration diagram of an endoscope system according to an embodiment.

An endoscope system (medical equipment system) 9 according to an embodiment shown in FIG. 1 has an endoscope (medical instrument) 30 including a plug 10 and a peripheral apparatus unit 40 including a receptacle (receiver) 20. A connector according to the embodiment is made up of the plug 10 and the receptacle 20.

The endoscope 30 has an elongated insertion portion 31 which is inserted into a subject, an operating unit 35 which is provided at a proximal end of the insertion portion 31, and a universal cord 36 which extends from the operating unit 35. The plug 10 is provided at an end portion of the universal cord 36. The operating unit 35 has a button for operating endoscope functions and a bending operation knob. The insertion portion 31 of the endoscope 30 has, in order from a side of a distal end, a distal end portion 32 having an image pickup unit (not illustrated), a bendable bending portion 33 provided at a proximal end of the distal end portion 32, and an elongated flexible tube 34 provided at a proximal end of the bending portion 33.

In this case, the side of a distal end refers to a direction of separation from the operating unit 35 along the insertion portion 31 or the universal cord 36. In other words, while a side having the distal end portion 32 is referred to as the side of a distal end, from the perspective of the universal cord 36, a side provided with the plug 10 is the side of a distal end.

In the peripheral apparatus unit 40, a processor 41, a monitor 42, a gas supply apparatus 43 as a fluid supply apparatus, a keyboard 44, and the like are placed on a stand. The processor 41 (a connected member) has the receptacle 20 and a CPU 41A. The CPU 41A performs control of the endoscope system 9 as a whole and processes image signals outputted by the image pickup unit. An image processed by the processor 41 is displayed on the monitor 42. The keyboard 44 is used by a user to input data and the like to the processor 41. The gas supply apparatus 43 supplies a pressurized gas such as air, carbon dioxide gas, or nitrogen gas.

In the embodiment, the processor 41 is a light source apparatus (a connected member) which has an internal light source. The processor 41 is not limited to a light source apparatus. In other words, a device having a receptacle to which a connector 1 of the endoscope 30 is connected is the connected member.

The configuration of the endoscope system 9 described above is merely an example and the endoscope system according the present disclosure is not limited to the configuration described above.

Figure 2:
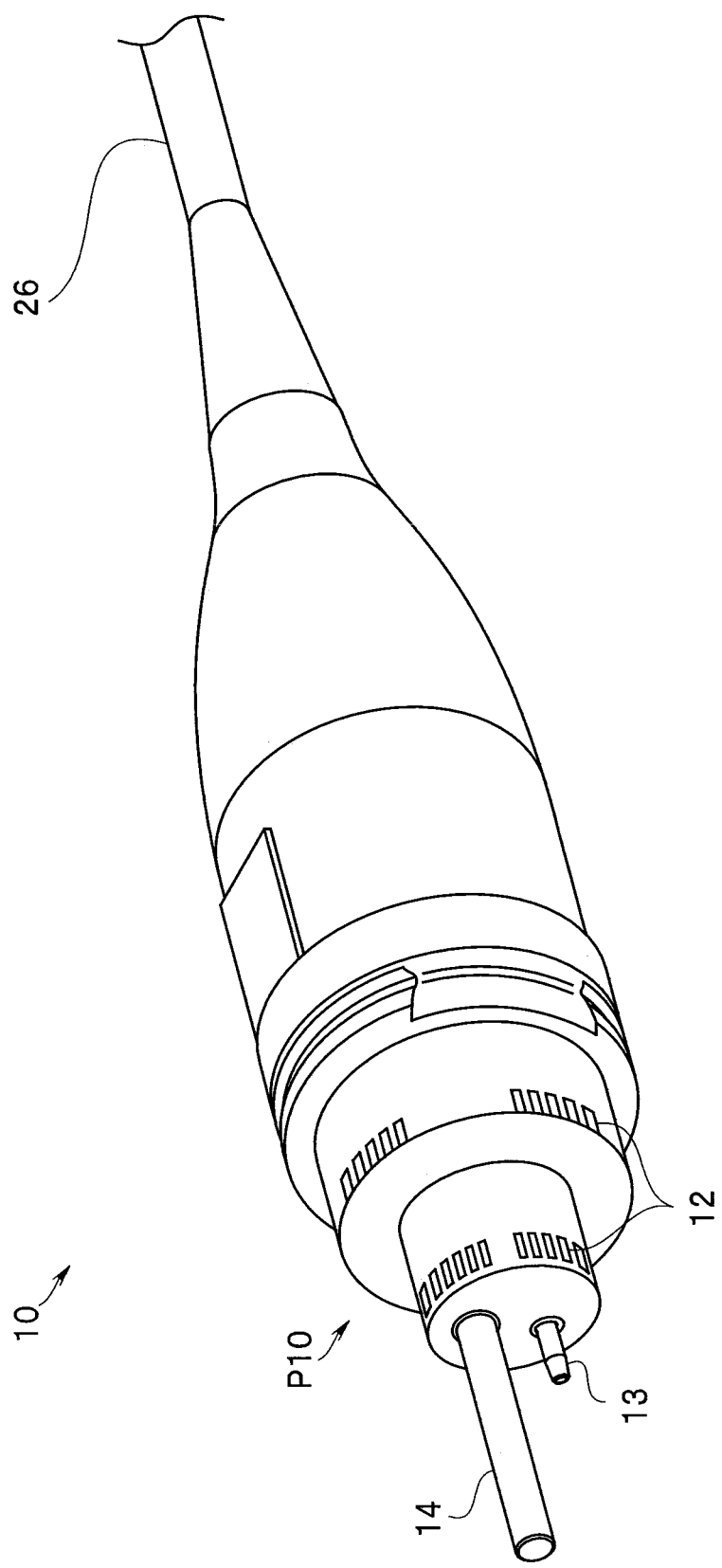
FIG. 2 is an external view of a plug according to a first embodiment.

As shown in FIG. 2, the plug 10 has a projection P10 at a distal end. The projection P10 includes a plurality of electric contacts 12, a light guide pipe sleeve 14, and a gas feeding pipe sleeve 13. The plurality of electric contacts 12 make up a first interface. Illuminating light from the light source is incident to the light guide pipe sleeve 14. A fluid from the gas supply apparatus 43 is fed to the gas feeding pipe sleeve 13. The fluid is a liquid or a gas.

Figure 3:
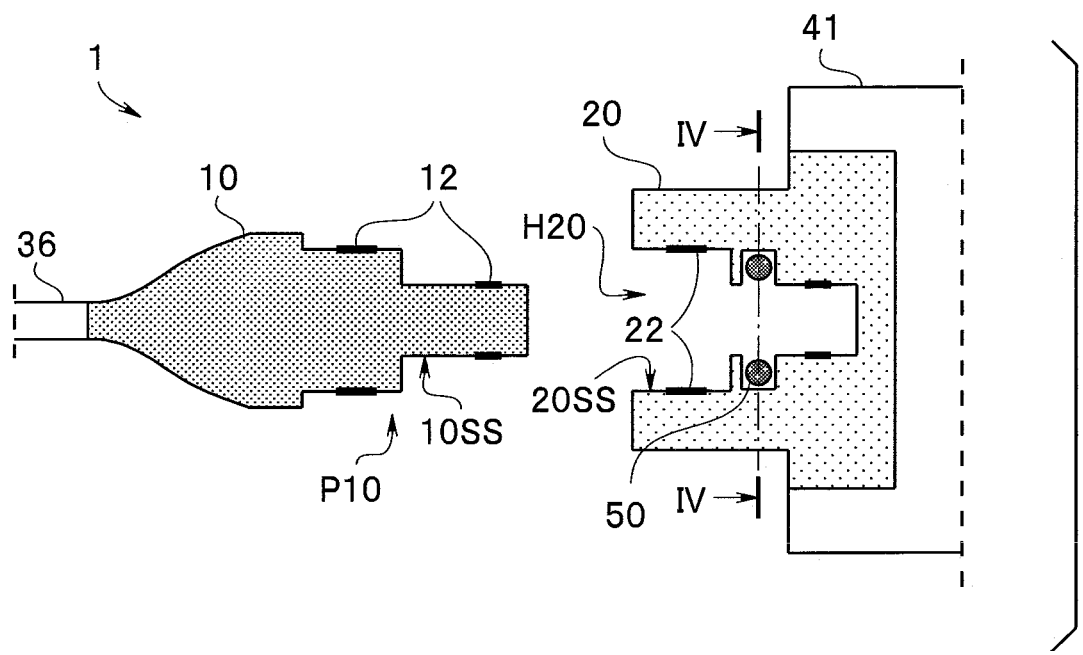
FIG. 3 is a sectional schematic view of a connector according to the first embodiment.

As shown in FIG. 3, the receptacle 20 has a recess H20 into which the projection P10 of the plug 10 is inserted. The recess H20 includes a first recess section and second recess section. The first recess section and the second recess section of the recess H20 are each provided with a plurality of electric contacts 22 which make up a second interface. The second recess section is axially inward from the first recess section. In cross-section, surfaces of the first recess section are separated by a first distance and surfaces of the second recess section are separated by a second distance. The first distance is larger than the second distance. This cross-section is a plane containing the longitudinal axis 120 (FIG. 8) of the receptacle H20. When the plug 10 is inserted into the receptacle 20, each of the plurality of electric contacts 12 that make up the first interface is connected to each of the plurality of electric contacts 22 that make up the second interface.

Although not illustrated, the receptacle 20 is provided with a light guide output end which is optically coupled to the light guide pipe sleeve 14 of the plug 10 and a gas feeding tube which passes through the gas feeding pipe sleeve 13.

When the universal cord 36 is pulled during an operation of the endoscope 30, the plug inserted into the receptacle may become detached from the receptacle or an electric connection between the plug and the receptacle may become unstable.

Figure 4A:
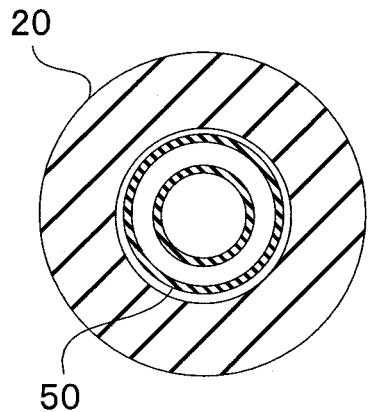
FIG. 4A is a sectional view taken along line IV-IV in FIG. 3.

In the connector 1 according to the present embodiment, a ring-shaped balloon 50 (inflatable body, FIG. 4A) is provided in a groove (channel) of a side surface 20SS of the recess H20 of the receptacle 20. The groove is provided in the second recess section of the recess H20. And the balloon 50 has an outer periphery surface and an inner periphery surface. The inner periphery surface defines a central opening in the balloon 50. The balloon 50 is formed of an elastic resin. Therefore, the balloon 50 is an expanding body which expands when a fluid is injected inside the balloon 50 and contracts when the fluid is discharged. In other words, a volume of the expanding body reversibly changes.

Figure 4B:
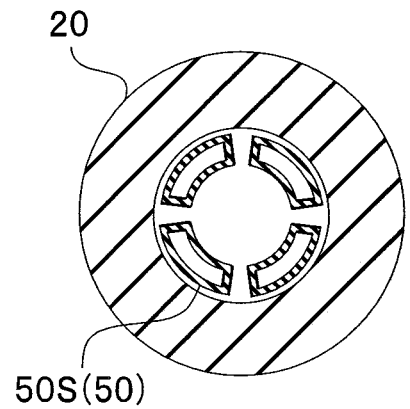
FIG. 4B is a sectional view of a balloon according to a modification.

As shown in FIG. 4B, the receptacle 20 may have a plurality of balloons 50S provided at rotationally symmetrical positions with respect to a central axis of the recess H20. In other words, the shape of the balloon is not limited to a ring shape.

Figure 5:
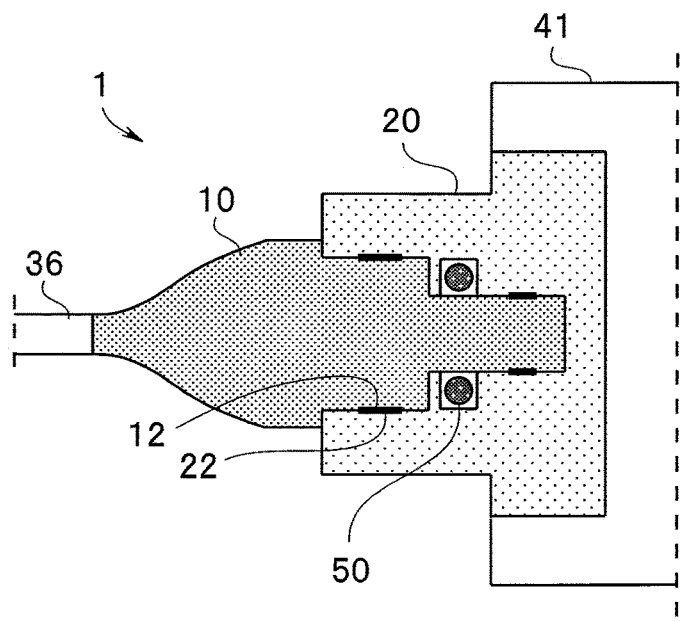
FIG. 5 is a sectional schematic view of the connector according to the first embodiment.

As shown in FIG. 5, the balloon 50 is positioned in a gap G between the side surface 20SS of the recess H20 of the receptacle 20 and a side surface 10SS of the projection P10 of the plug 10 which is created when the projection P10 is inserted into the recess H20. The balloon 50 has a deflated state and an inflated state. When the plug 10 is inserted into the receptacle 20, the balloon 50 is housed in the groove of the side surface 20SS of the recess H20 in the deflated state.

Figure 6:
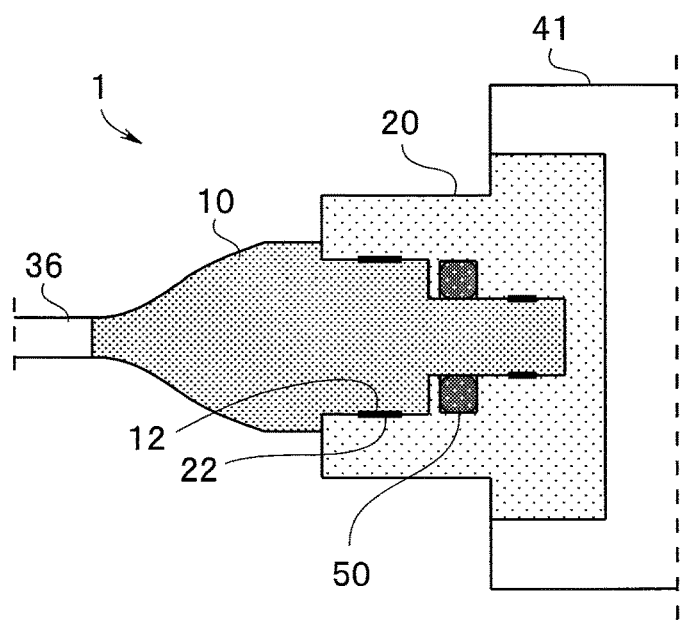
FIG. 6 is a sectional schematic view of the connector according to the first embodiment.

As shown in FIG. 6, when the balloon 50 is in inflated state, the balloon 50 presses against an outer peripheral surface of the projection P10 of the plug 10. In other words, an opening distance of the central opening is less than the second distance of the second recess section of the recess H20. Therefore, the plug 10 is fixed to the receptacle 20 by the expanded balloon 50. In other words, due to the expansion of the balloon 50, a mechanical coupling strength between the receptacle 20 and the plug 10 increases.

An example of a measuring method of the mechanical coupling strength is shown below. First, the plug 10 is connected to the receptacle 20. Second, a string is hooked on the plug 10. Third, the string is connected to a known force gauge (push-pull gauge). Finally, a maximum force value at which the plug 10 is removed from the receptacle 20 with pulling the known force gauge is recorded as the mechanical coupling strength.

With the connector 1 according to the present embodiment, there is no risk of the plug 10 becoming detached from the receptacle 20 or an electric connection between the plug 10 and the receptacle 20 becoming unstable.

With the endoscope system 9 provided with the endoscope 30 having the plug 10, the processor 41 which is a connected member having the receptacle 20, and the balloon 50 which is an expanding body, there is no risk of the plug 10 becoming detached from the receptacle 20 or an electric connection between the plug 10 and the receptacle 20 becoming unstable.

<Operation Method of Connector>

Figure 7:
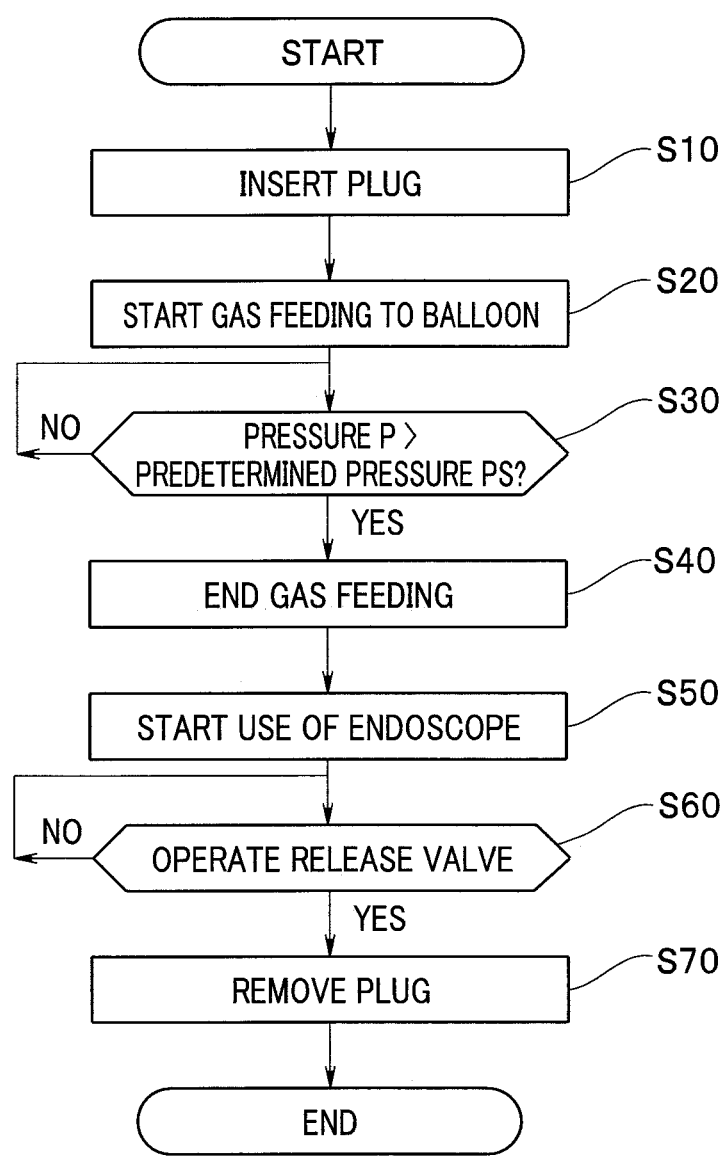
FIG. 7 is a flow chart of an operation method of the connector according to the first embodiment.

An operation method of the connector 1 will be described using FIG. 8 along a flow chart shown in FIG. 7.

<Step S10> Insertion of Plug

The plug 10 in which electric contacts 12 which make up the first interface are provided in the projection P10 is prepared. The receptacle 20 in which electric contacts 22 which make up the second interface are provided in the recess H20 is prepared. When the plug 10 of the endoscope 30 is inserted into the receptacle 20 of the processor 41, the electric contacts 22 of the receptacle 20 and the electric contacts 12 of the plug 10 are connected to each other.

<Step S20> Start of Gas Feeding

Figure 8:
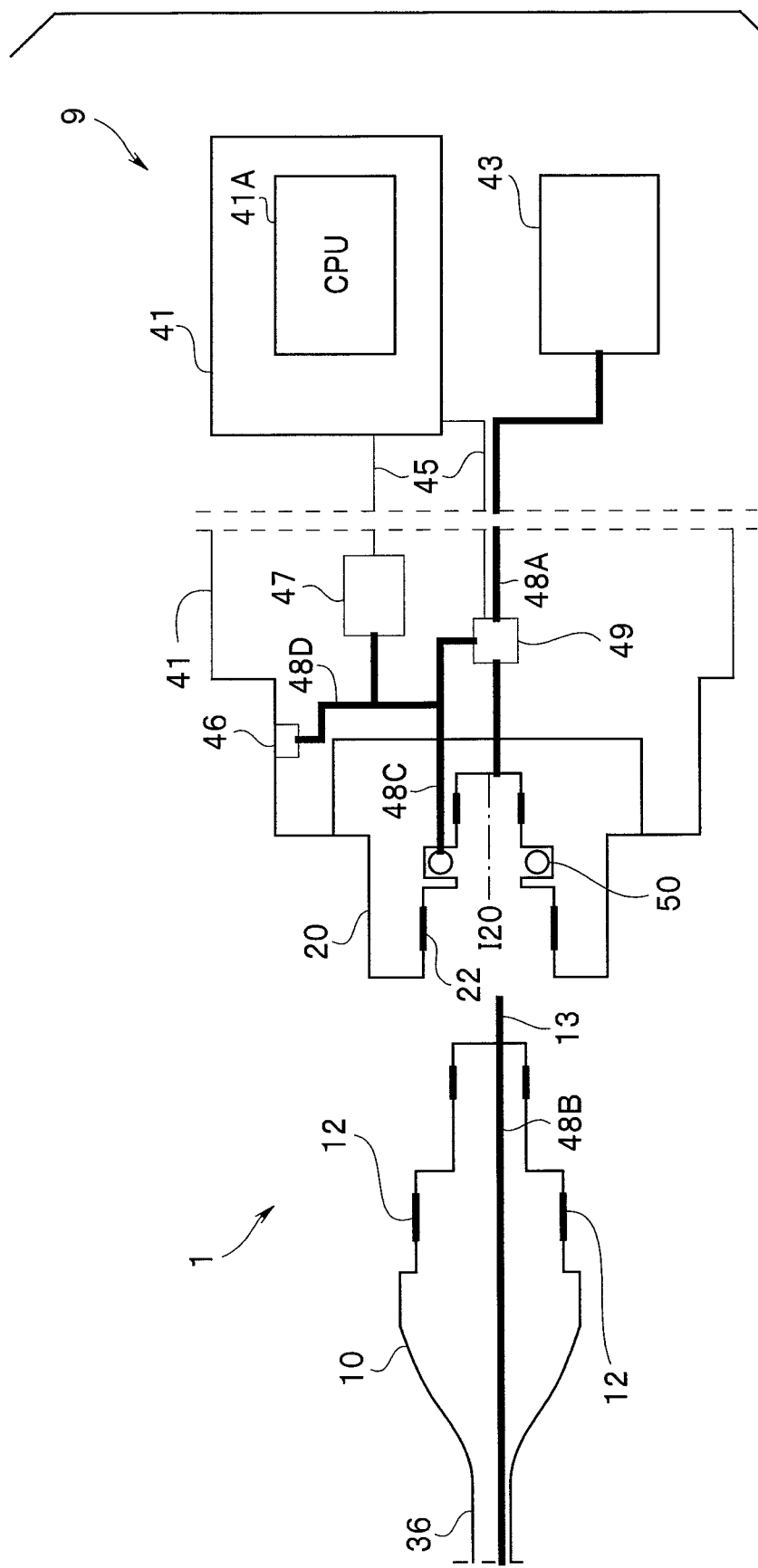
FIG. 8 is a configuration diagram of the connector according to the first embodiment.

As shown in FIG. 8, the gas supply apparatus 43 is connected to a first conduit 48A which is provided in the receptacle 20 of the processor 41. On the other hand, the gas feeding pipe sleeve 13 of the plug 10 is connected to a second conduit 48B. Although not illustrated, the second conduit 48B is provided all the way to the distal end portion 32 of the insertion portion 31 via the operating unit 35. Gas supplied by the gas supply apparatus 43 is discharged from an opening of the second conduit 48B of the distal end portion 32 and removes foreign objects adhered to a lens of the image pickup unit or the like.

The endoscope system 9 has a three-way valve (first valve) 49 which is controlled by the CPU 41A of the processor 41. The gas supplied by the gas supply apparatus 43 is also used to expand the balloon 50. The balloon 50 is connected to a third conduit 48C. The three-way valve 49 supplies gas supplied from the first conduit 48A to the second conduit 48B or the third conduit 48C. The three-way valve 49 may be provided in the receptacle 20.

Due to the connection of the electric contacts 22 and the electric contacts 12, the CPU 41A of the processor 41 detects that the plug 10 of the endoscope 30 is inserted into the receptacle 20 of the processor 41. When the CPU 41A detects that the plug 10 is inserted into the receptacle 20, the CPU 41A controls the three-way valve 49 so that gas supplied from the first conduit 48A is supplied to the third conduit 48C. Therefore, gas feeding to the balloon 50 is started.

<Step S30> Pressure Measurement

The endoscope system 9 has a pressure gauge 47 which measures pressure P of a gas in the balloon 50 (the third conduit 48C). The pressure P measured by the pressure gauge 47 is transmitted to the CPU 41A of the processor 41. Gas feeding to the balloon 50 continues until the pressure P reaches a predetermined pressure PS (YES). The predetermined pressure PS may be set in advance to pressure which enables the balloon 50 to sufficiently expand.

<Step S40> End of Gas Feeding

When the pressure P exceeds the predetermined pressure PS (S30: YES), the CPU 41A of the processor 41 controls the three-way valve 49 so that gas having been supplied to the third conduit 48C is supplied to the second conduit 48B. Therefore, gas feeding to the balloon 50 ends. The plug 10 is fixed to the receptacle 20 by the expanded balloon 50.

When the CPU 41A of the processor 41 has a clock (not illustrated) which measures time and measures a supply time period of gas to the balloon 50, the supply of fluid to the balloon 50 may be stopped when the supply time period exceeds a prescribed time period.

<Step S50> Start of Use of Endoscope

The insertion portion 31 of the endoscope 30 is inserted into the subject to observe regions that are not visible from the outside and perform various kinds of treatment using treatment instruments. Foreign objects adhered to a lens of the image pickup unit or the like are removed by the gas supplied to the second conduit 48B.

<Step S60> Operation of Release Valve

For example, the endoscope system 9 has a fourth conduit 48D near the receptacle 20 and a release valve (second valve) 46 provided in the fourth conduit 48D. Of the release valve 46, a first end is connected to the third conduit 48C and a second end is opened to atmosphere. When the use of the endoscope 30 ends and the release valve 46 is operated by an operator (S60: YES), the gas inside the balloon 50 is discharged and the balloon 50 contracts due to an elastic force of the balloon 50.

At least one of the fourth conduit 48D and the release valve 46 may be provided in the receptacle 20. For example, the release valve 46 may be a solenoid valve opening/closing of which is controlled by the CPU 41A of the processor 41 in accordance with an operation of an operating switch of the operating unit 35.

In addition, when the endoscope system 9 has a suction apparatus which sucks gas, a suction tube connected to the suction apparatus may be connected to the third conduit 48C via a second three-way valve. In other words, the second three-way valve may be controlled by the CPU 41A of the processor 41 to suck gas from the balloon 50 to cause the balloon 50 to contract.

<Step S70> Removal of Plug

When the balloon 50 contracts, since a coupling strength between the plug 10 and the receptacle 20 decreases, the plug 10 can be readily removed from the receptacle 20.

In an operation method of the endoscope system 9 provided with the endoscope 30 having the plug 10, the processor 41 which is a connected member having the receptacle 20, and the balloon 50 which is an expanding body, there is no risk of the plug 10 becoming detached from the receptacle 20 or an electric connection between the plug 10 and the receptacle 20 becoming unstable.

Depending on the coupling strength of the connector 1 due to the balloon 50, the plug 10 fixed to the receptacle 20 by the expanded balloon 50 can be removed if enough strong force is applied. In other words, the balloon 50 need not necessarily be contracted for removal.

The endoscope system 9 may have a liquid feeding apparatus as a fluid supply apparatus and the balloon 50 may be expanded by a liquid such as water which is supplied by the liquid feeding apparatus. Furthermore, the balloon 50 may be filled with a water-absorbing polymer and the water-absorbing polymer may be expanded.

Gas may be supplied to the endoscope system 9 via a plurality of pipes from a gas feeding apparatus which is installed at a location that differs from a room where the endoscope system 9 is installed. In other words, the fluid supply apparatus is not an essential component of the endoscope system 9.

First Modification of First Embodiment

A connector, an endoscope system, and an operation method of a connector according to embodiments and modifications described below are similar to the connector 1, the endoscope system 9, and the operation method of a connector according to the first embodiment and produce same advantageous effects. Therefore, components with the same functions will be assigned same signs and descriptions of such components will be omitted.

Figure 9:
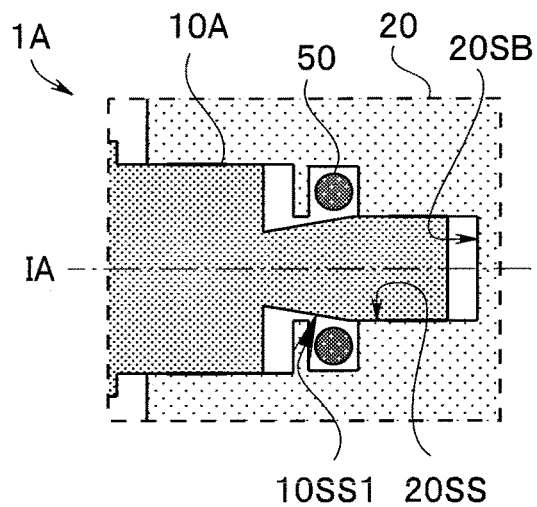
FIG. 9 is a sectional schematic view of a connector according to a first modification of the first embodiment.

In a connector 1A (endoscope system 9A) according to the present modification shown in FIG. 9, the projection P10 of a plug 10A has a side surface 10SS1. The side surface 10SS1 is inclined with respect to an insertion axis IA (insertion direction). More specifically, in a region where the projection P10 faces the balloon 50 which is an expanding body, the projection P10 becomes thicker toward a distal end.

Figure 10:
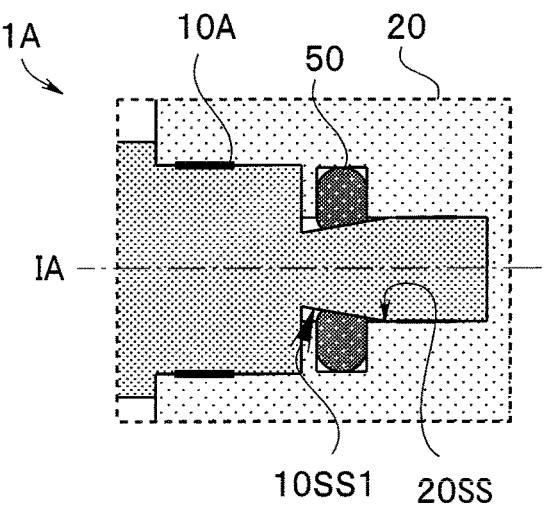
FIG. 10 is a sectional schematic view of the connector according to the first modification of the first embodiment.

FIG. 9 shows the connector 1A in a so-called half-inserted state where the plug 10A is not completely inserted into the receptacle 20. By comparison, FIG. 10 shows the connector 1A in which the balloon 50 is expanded. In the connector 1A, due to the expansion of the balloon 50, a pressing force oriented in an insertion direction is generated. Therefore, the plug 10 is pushed inward toward a bottom surface 20SB of the recess H20 of the receptacle 20.

With the connector 1A, the expansion of the balloon 50 not only increases a coupling strength between the plug 10 and the receptacle 20 but also enables the plug 10A in a half-inserted state to be pushed inward to a normal position of the receptacle 20.

Second Modification of First Embodiment

Figure 11:
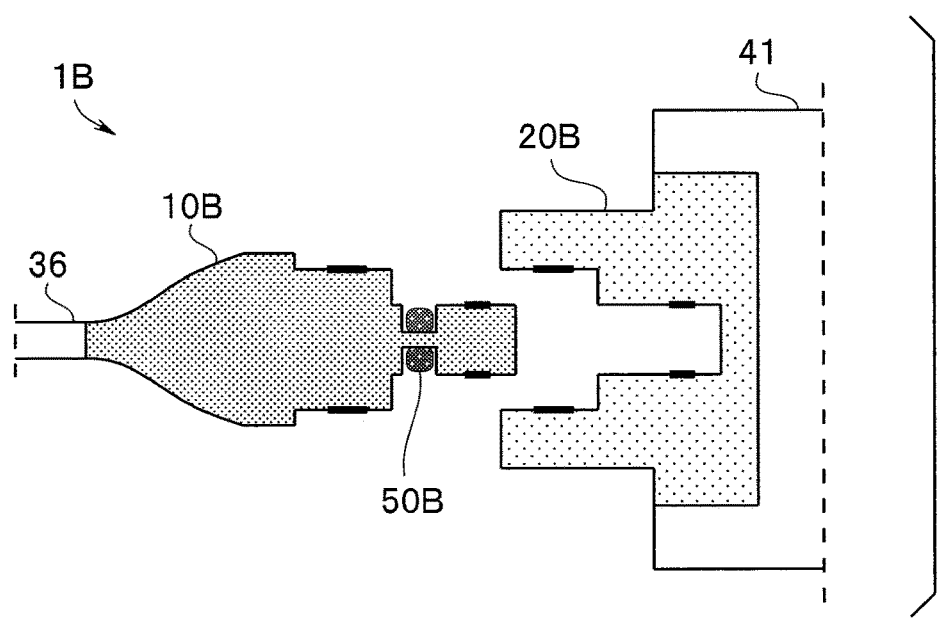
FIG. 11 is a sectional schematic view of a connector according to a first modification of a second embodiment.
Figure 12:
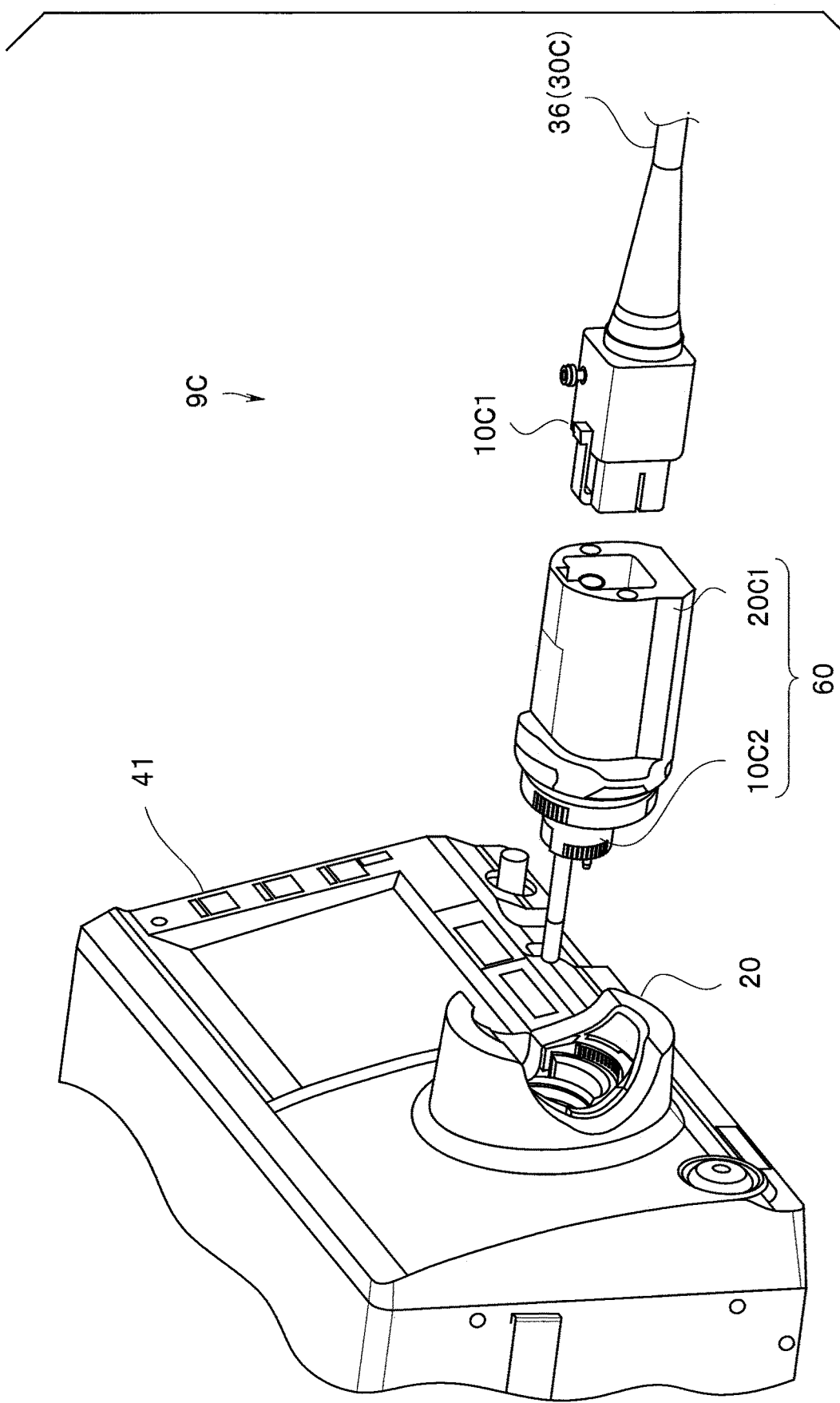
FIG. 12 is a perspective view of an endoscope system according to the second embodiment.
Figure 13:
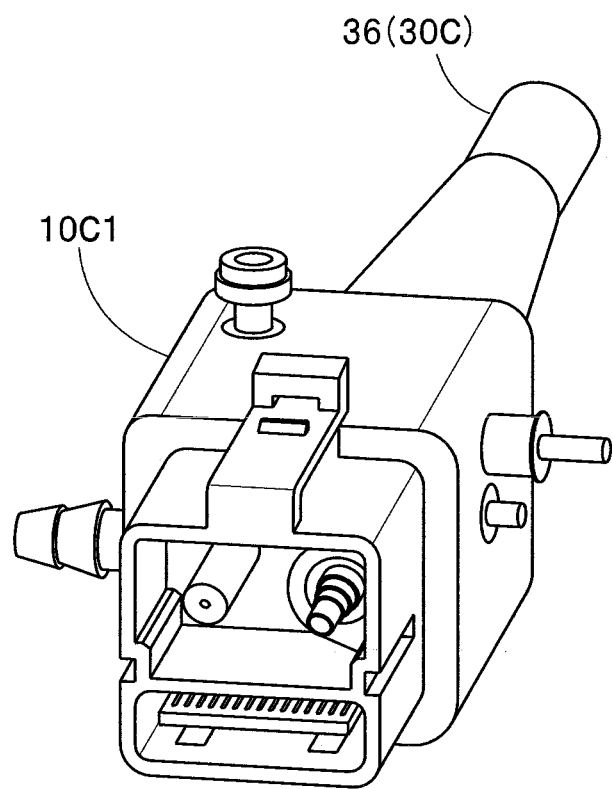
FIG. 13 is a perspective view of an adapter of the connector according to the second embodiment.
Figure 14:
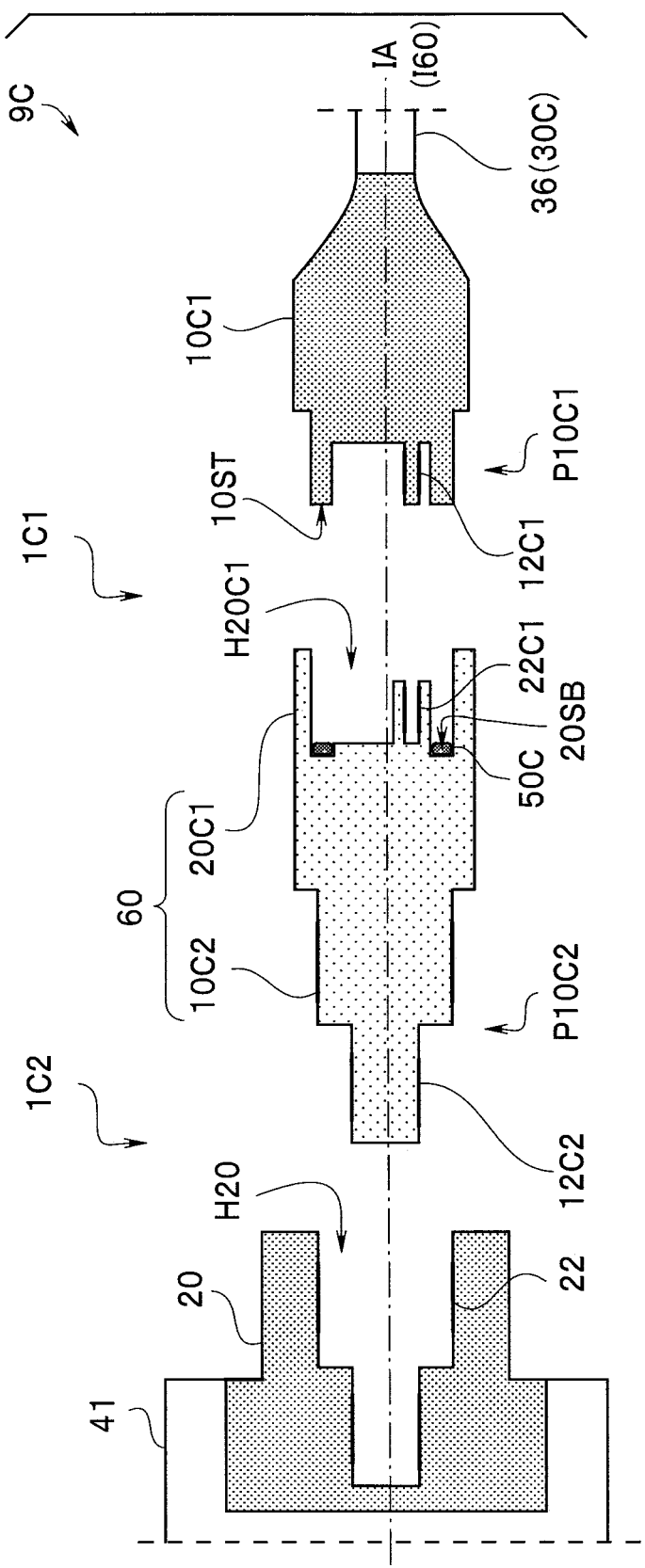
FIG. 14 is a sectional schematic view of the connector according to the second embodiment.

In a connector 1B (endoscope system 9B) according to the present modification shown in FIG. 11, a balloon 50B is provided in a plug 10B. The plug 10B is fixed to a receptacle 20B by the balloon expanded by gas feeding.

In the connector 1B in which the balloon 50B is provided in the plug 10B, a three-way valve for switching among gas feeding paths may be provided in the plug 10B.

With the connector 1B, there is no risk of the plug 10B becoming detached from the receptacle 20B or an electric connection between the plug 10B and the receptacle 20B becoming unstable.

It goes without saying that the coupling strength between the plug and the receptacle is increased by using a connector in which the plug and the receptacle are both provided with balloons as compared to the connectors 1A and 1B.

Second Embodiment

In an endoscope system 9C according to the present embodiment shown in FIGS. 12 to 16, an endoscope 30C is connected to the processor 41 using an adapter 60. In other words, in the endoscope system 9C, a connected member to which a plug 10C1 of the endoscope 30C is connected is the adapter 60.

The endoscope 30C is a so-called single-use endoscope which is used only once. The endoscope 30C differs in a structure of a plug from a so-called reused endoscope which is cleaned and repetitively used. The adapter 60 is used to connect the peripheral apparatus unit 40 (processor 41) for a reused endoscope and the endoscope 30C to each other.

The adapter 60 has a receptacle (second end) 20C1 and a plug (first end) 10C2. The receptacle 20C1 is connected to the plug 10C1 provided at an end portion of the universal cord 36 of the endoscope 30C. The plug 10C2 is connected to the receptacle 20 of the processor 41.

The plug 10C1 having a projection P10C1 is provided with an electric contact 12C1 in the projection P10C1. The receptacle (adapter receiver) 20C1 having a recess H20C1 is provided with an electric contact 22C1 to be connected to the electric contact 12C1 in the recess H20C1. The plug 10C1 and the receptacle 20C1 make up a connector 1C1.

The plug 10C2 having a projection P10C2. The projection P10C2 includes a first peripheral surface section and a second peripheral surface section. The second peripheral surface section is axially inward from the first peripheral surface section. In cross-section, surfaces of the first peripheral surface section are separated by a first distance and surfaces of the second peripheral surface section are separated by a second distance. This cross-section is a plane containing the longitudinal axis I60 of the adapter 60. The first distance is less than the second distance. The first peripheral surface section and the second peripheral surface section are each provided with an electric contact 12C2 in the projection P10C2. The receptacle 20 having the recess H20 is provided with an electric contact 22 to be connected to the electric contact 12C2 in the recess H20. The plug 10C2 and the receptacle 20 make up a connector 1C2.

In order to perform an examination of a next patient after using the single-use endoscope, the plug 10C1 of the used endoscope is removed from the adapter and the plug 10C1 of the new endoscope is inserted into the adapter. However, a coupling strength of the connector 1C1 may be lower than a coupling strength of the connector 1C2. As a result, when removing the plug 10C1 of the used endoscope from the adapter, the adapter into which the plug 10C1 is inserted may become inadvertently removed from the processor 41. In such a case, an operator must perform an operation of removing the plug 10C1 of the used endoscope from the adapter, inserting the removed adapter into the processor 41, and inserting the plug 10C1 of the new endoscope into the adapter.

In the connector 1C1 of the endoscope system 9C, a balloon 50C which is an expanding body (inflatable body) is provided in a gap (channel) between the bottom surface 20SB of the recess H20C1 of the receptacle 20C1 and a distal end surface 10ST of the projection P10C1 of the plug 10C1.

The balloon 50C is reversibly inflatable between a deflated state and an inflated state.

Figure 15:
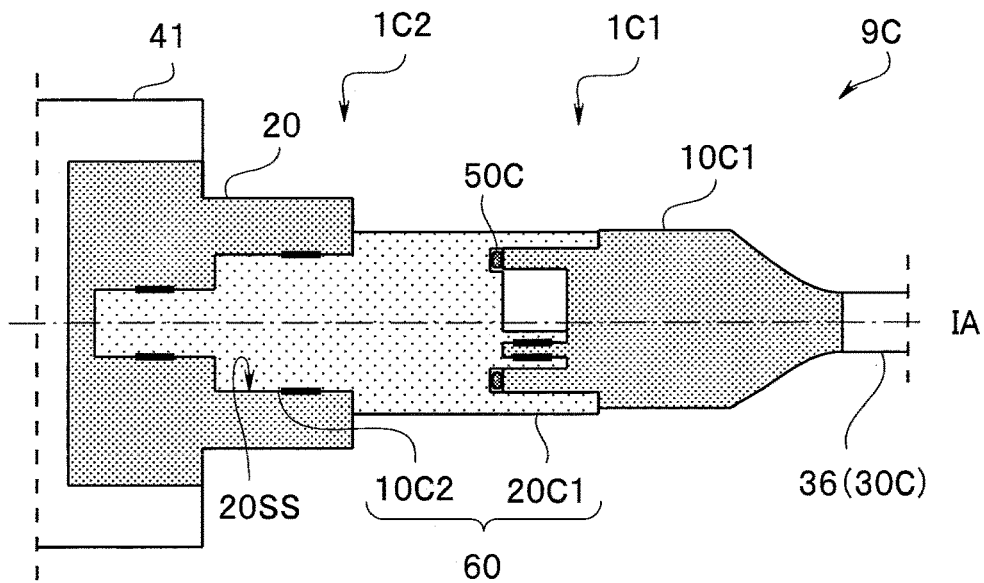
FIG. 15 is a sectional schematic view of the connector according to the second embodiment.

As shown in FIG. 15, in the deflated state, the balloon 50C does not intersect the imaginary plane containing the bottom surface 20SB of the recess H20C1.

Figure 16:
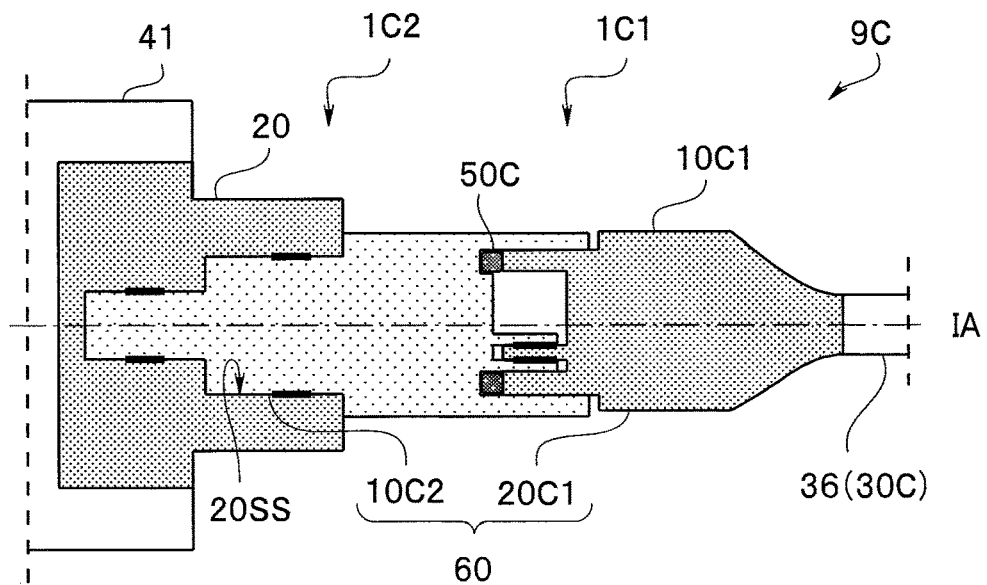
FIG. 16 is a sectional schematic view of the connector according to the second embodiment.

As shown in FIG. 16, in the inflated state, the balloon 50C intersects an imaginary plane containing the bottom surface 20SB of the recess H20C1. In other words, when the balloon 50C inflated, since the plug 10C1 is pressed against the balloon 50C, a so-called half-inserted state is created. In other words, due to the expansion of the balloon 50C, a coupling strength between the receptacle 20C1 and the plug 10C1 decreases.

In the endoscope system 9C, when replacing the endoscope 30C, the balloon 50C expands under control of the processor 41 and a coupling strength of the connector 1C1 decreases. As a result, a coupling strength of the connector 1C1 becomes lower than a coupling strength of the connector 1C2.

An example of a measuring method of the mechanical coupling strength is shown below. First, the plug 10C1 is connected to the adapter 60 and the adapter 60 is connected to the receptacle 20. Second, a string is hooked on the plug 10C1. Third, the string is connected to a known force gauge (push-pull gauge). Finally, a maximum force value at which the plug 10C1 is removed from the adapter 60 with pulling the known force gauge is recorded as the mechanical coupling strength.

As a result, since the adapter 60 into which the plug 10C1 is inserted is prevented from being removed from the processor 41 when removing the plug 10C1 of the used endoscope 30C from the adapter 60, the endoscope system 9C provides favorable workability.

A gap between the plug 10C1 and the adapter 60 in which the balloon 50C is positioned may be a space between two surfaces which are each orthogonal to an insertion direction of the plug and which face each other. The balloon 50C may be provided on the distal end surface 10ST of the projection P10 of the plug 10C1. In addition, the balloon 50C may be provided in a space between two surfaces by which the receptacle 20C1 and the plug 10C1 are orthogonal to an insertion axis IA of the plug 10C1 and face each other or, in other words, provided in a periphery of the recess H20C1 or a periphery of the projection P10C1.

Modification of Second Embodiment

Figure 17:
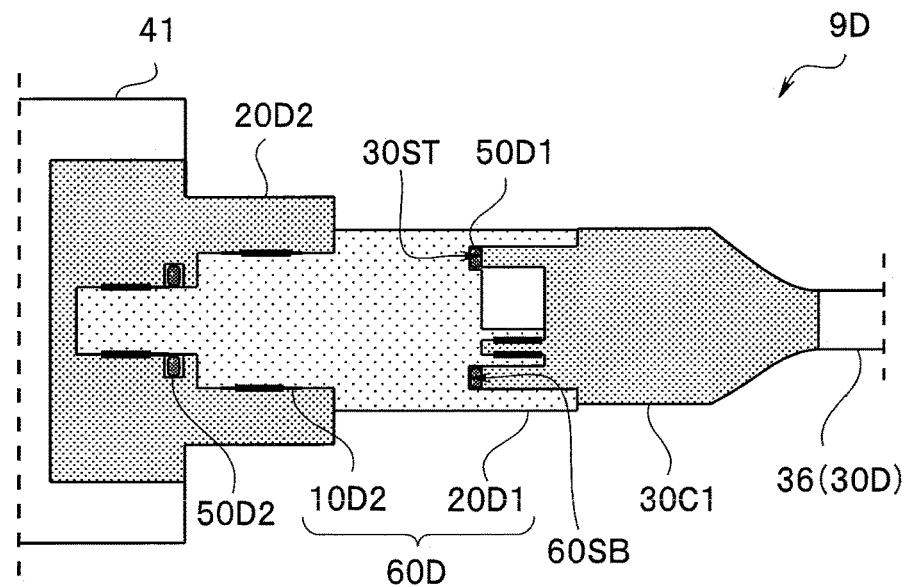
FIG. 17 is a sectional schematic view of a connector according to a modification of the second embodiment.

In a connector 1D (endoscope system 9D) according to the present modification shown in FIG. 17, an adapter 60D is provided with two kinds of balloons 50D1 and 50D2.

The balloon 50D1 is provided in a gap between a bottom surface 60SB of a recess of a receptacle 20D1 of the adapter 60D and a distal end surface 30ST of a projection of a plug 30C1 of an endoscope 30D. The balloon 50D2 is provided in a gap between a side surface of a projection P10D1 of a plug 10D2 of the adapter 60D and a side surface of a recess H20D2 of a receptacle 20D2 of the processor 41.

During use of the endoscope 30D, the balloon 50D2 expands under control of the processor 41 and a coupling strength of a connector 1D2 between the processor 41 and the adapter 60D increases. When replacing the endoscope 30D, the balloon 50D1 expands under control of the processor 41 and a coupling strength of a connector 1D1 between the endoscope 30D and the adapter 60D increases.

It goes without saying that, even when an adapter only has a balloon provided in a gap between a side surface of a plug of the adapter and a side surface of a receptacle of the processor 41, the adapter can be prevented from being removed from the processor 41 when replacing the endoscope 30C.

Third Embodiment

Figure 18:
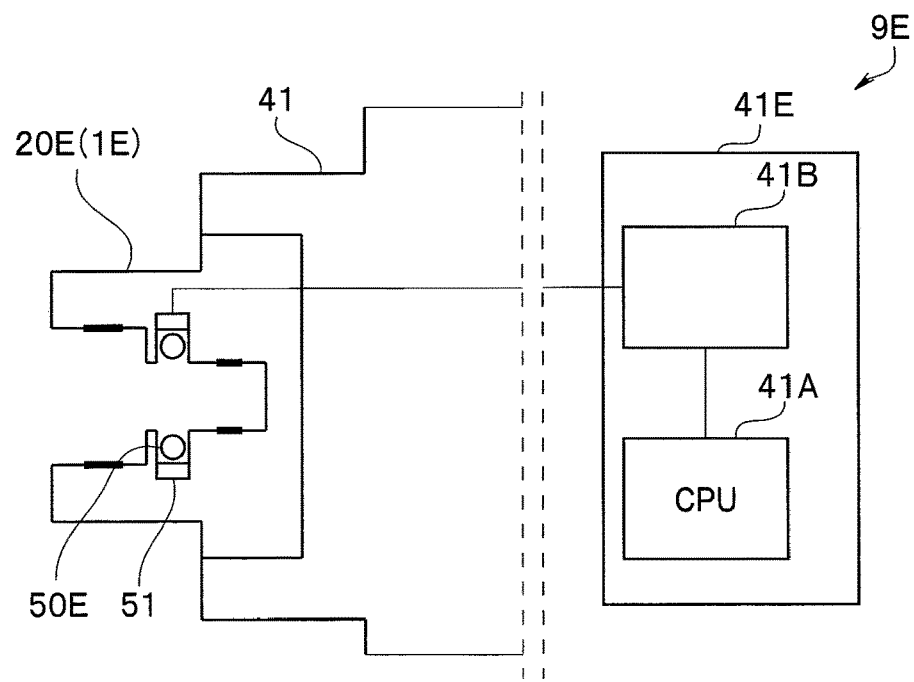
FIG. 18 is a configuration diagram of a connector according to a third embodiment.

In a connector 1E (endoscope system 9E) according to the present embodiment shown in FIG. 18, an expanding member is a balloon 50E which internally has a small amount of liquid such as water (not illustrated). An inside of the balloon 50E is hermetically sealed.

Due to control by the CPU 41A of the processor 41, power is supplied from a power supply 41B to a heater 51 which heats the balloon 50E. Since a volume of the liquid increases when the liquid is heated and turns into gas, the balloon 50E expands. An effect of the expanded balloon 50E is as already described.

In addition, the fact that the coupling strength of the connector declines depending on an installation position of the balloon 50E is also as already described.

Furthermore, the expanding member is not limited to a balloon as long as a volume of the expanding member reversibly changes. For example, a material with a large coefficient of thermal expansion can be used as the expanding member. In addition, artificial muscle can be used as the expanding member.

While the endoscope 30 described above is a flexible endoscope, an endoscope according to another embodiment may be a rigid endoscope with a rigid straight tube. In addition, the endoscope 30 may be used in both medical and industrial applications.

The present disclosure is not limited to the embodiment explained above. Various changes, alterations, and the like are possible within a range not changing the gist of the disclosure.

What is claimed is:

1. A processor, comprising:
a receiver including a recess,
wherein the recess includes:
a channel, and
an inflatable body located in the channel,
wherein the inflatable body has an outer periphery surface and an inner periphery surface, the inner periphery surface surrounding a central opening in the inflatable body, and
wherein the inflatable body is reversibly inflatable between a deflated state and an inflated state.

2. The processor according to claim 1, wherein the recess further includes:
a first recess section, and
a second recess section,
wherein the channel is located in the second recess section,
wherein, in cross-section, surfaces of the first recess section are separated by a first distance and surfaces of the second recess section are separated by a second distance, and the first distance is larger than the second distance,
wherein, in the inflated state, an opening distance of the central opening is less than the second distance, and
wherein the inflatable body is a balloon.

3. A medical equipment system, comprising:
the processor according to claim 2; and
a medical instrument including a plug,
wherein the plug includes a first end including a first peripheral surface section and a second peripheral surface section, the second peripheral surface section being axially inward from the first peripheral surface section,
wherein the plug is insertable into the receiver of the processor with the first peripheral surface section of the plug located in the second recess section and the second peripheral surface section located in the first recess section, and
wherein, in the inflated state, the inner periphery surface of the inflatable body contacts the first peripheral surface section of the plug.

4. The medical equipment system according to claim 3, wherein the medical instrument is an endoscope,
wherein the endoscope includes:
an insertion portion insertable into a subject,
an operating unit located at a proximal end of the insertion portion, and
a universal cord extending from the operating unit, and
wherein the plug is connected to the universal cord.

5. The medical equipment system according to claim 3, wherein the inflatable body is a balloon.

6. The medical equipment system according to claim 3, further comprising:
a plurality of fluid conduits and a first valve,
wherein the plurality of fluid conduits includes a first fluid conduit, a second fluid conduit, and a third fluid conduit,
wherein the third fluid conduit is connected to the inflatable body,
wherein the first valve is switchable between a first connection state and a second connection state,
wherein, in the first connection state, the first fluid conduit is connected to the third fluid conduit, and
wherein, in the second connection state, the first fluid conduit is connected to the second fluid conduit.

7. The medical equipment system according to claim 3, wherein the processor is configured to process an image signal, and
wherein the receiver is configured to receive the plug, and
wherein the receiver is configured such that a strength of a connection between the receiver and the seated plug is greater in the inflated state than in the deflated state.

8. The processor according to claim 1, further comprising:
a plurality of fluid conduits and a first valve,
wherein the plurality of fluid conduits includes a first fluid conduit, a second fluid conduit, and a third fluid conduit,
wherein the third fluid conduit is connected to the inflatable body,
wherein the first valve is switchable between a first connection state and a second connection state,
wherein, in the first connection state, the first fluid conduit is connected to the third fluid conduit, and
wherein, in the second connection state, the first fluid conduit is connected to the second fluid conduit.

9. The processor according to claim 1, further comprising:
a plurality of fluid conduits; and
a plurality of valves,
wherein the plurality of fluid conduits includes a first fluid conduit, a second fluid conduit, a third fluid conduit, and a fourth fluid conduit,
wherein the plurality of valves includes a first valve and a second valve,
wherein the third fluid conduit is connected to the inflatable body,
wherein the first valve is switchable, in a first position, to connect the first fluid conduit to the second fluid conduit and, in a second position, to connect the first fluid conduit to the third fluid conduit,
wherein the fourth fluid conduit has a first end and a second end, the second end opposite to the first end, the first end connected to the third fluid conduit, and the second end connected to the second valve,
wherein the second valve is switchable between an open position and a closed position, and,
wherein, in the open position, the fourth fluid conduit is open to atmosphere.

10. The processor according to claim 1, wherein the receiver is configured to receive a plug of an endoscope, and wherein the receiver is configured such that a strength of a connection between the receiver and the seated plug is greater in the inflated state than in the deflated state.

11. The processor according to claim 10, wherein the channel includes a bottom surface and a plurality of side surfaces.

12. A method of operating the medical equipment system according to claim 3, the method comprising:
inserting the plug into the into the receiver of the processor; and
inflating the inflatable body to the inflated state.

13. The method according to claim 12, wherein the inflatable body is a balloon.

14. A method of operating the medical equipment system according to claim 6, the method comprising:
inserting the plug into the receiver of the processor;
attaching a fluid supply apparatus to supply a fluid to the third fluid conduit;
switching the first valve to the first connection state; and
supplying the fluid from the fluid supply apparatus to the inflatable body.

15. The method according to claim 14, further comprising:
measuring a pressure of the fluid in the inflatable body; and
stopping supplying the fluid when the pressure exceeds a predetermined pressure.

16. The method according to claim 15, wherein stopping supplying the fluid includes switching the first valve to the second connection state.

17. The method according to claim 16, wherein the inflatable body is a balloon.

18. The method according to claim 14, further comprising,
measuring a time period of supplying the fluid; and
stopping supplying the fluid when the time period exceeds a predetermined time period.

* * * * *